United States Patent
Asahina et al.

(10) Patent No.: US 6,833,010 B2
(45) Date of Patent: Dec. 21, 2004

(54) PRISMATIC BATTERY MODULE AND METHOD FOR MANUFACTURING THE SAME

(75) Inventors: Takashi Asahina, Toyohashi (JP); Shinji Hamada, Toyohashi (JP); Toyohiko Eto, Toyota (JP); Toshiyuki Sekimori, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 475 days.

(21) Appl. No.: 09/996,909

(22) Filed: Nov. 30, 2001

(65) Prior Publication Data

US 2002/0064708 A1 May 30, 2002

(30) Foreign Application Priority Data

Nov. 30, 2000 (JP) .................................. 2000-364826
Aug. 10, 2001 (JP) .................................. 2001-243420

(51) Int. Cl.[7] .......................... H01M 6/00; H01M 6/46; H01M 6/42; H01M 2/24; H01M 2/02
(52) U.S. Cl. ...................... 29/623.1; 429/154; 429/159; 429/160; 429/170
(58) Field of Search ................................ 429/154, 158, 429/159, 160, 170, 171, 172, 173, 174, 176; 29/623.1

(56) References Cited

U.S. PATENT DOCUMENTS

| | | | |
|---|---|---|---|
| 2,942,055 A | 6/1960 | Doyle et al. | 429/160 |
| 3,336,164 A | 8/1967 | Miller | 429/160 |
| 4,046,062 A | 9/1977 | Matter | 29/623.1 |
| 5,766,798 A | 6/1998 | Bechtold et al. | 429/211 |
| 5,871,861 A | 2/1999 | Hirokou et al. | 429/149 |
| 6,304,057 B1 | 10/2001 | Hamada et al. | 320/107 |

FOREIGN PATENT DOCUMENTS

EP 0962993 12/1999

*Primary Examiner*—Patrick Ryan
*Assistant Examiner*—Thomas H. Parsons
(74) *Attorney, Agent, or Firm*—Greenblum & Bernstein, P.L.C.

(57) ABSTRACT

A prismatic battery module employs a prismatic battery case having a single space formed by connecting a plurality of prismatic cell cases in series. Collectors are connected to the lead portions on both sides of the electrode plate group, and adjacent collectors of associated electrode plate groups are connected to each other by using an electroconductive adhesive. The electrode plate groups connected in series are disposed in the prismatic battery case. Thereafter, a sealing material is applied to each space between each of the outer peripheries of the adjacent collectors and the wall surface of the prismatic battery case to partition the plurality of cell cases from one another.

26 Claims, 12 Drawing Sheets

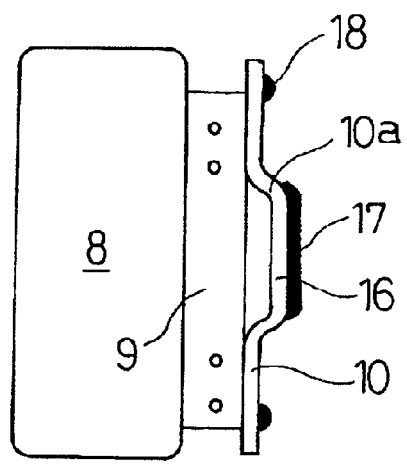
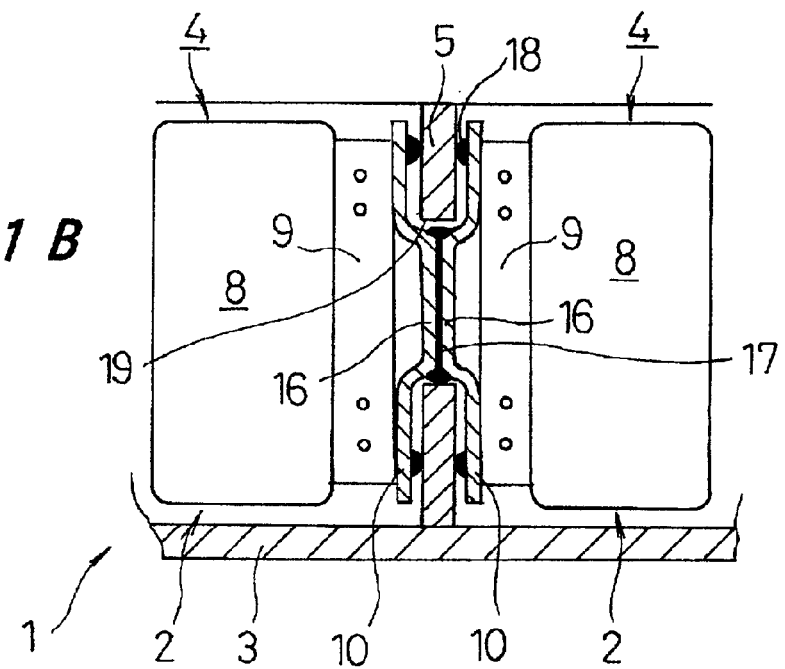

PRISMATIC BATTERY MODULE AND METHOD FOR MANUFACTURING THE SAME

The present disclosure relates to subject matter contained in priority Japanese Patent Application Nos. 2000-364826 and 2001-243420, filed on Nov. 30, 2000 and Aug. 10, 2001 respectively, the contents of which is herein expressly incorporated by reference in its entirety.

BACKGROUND OF THE INVENTION

1. Field of the Invention

The present invention relates to a prismatic battery module and a method for manufacturing the same. More particularly, the invention relates to a prismatic battery module which is made by connecting a plurality of cells together and designed to reduce an internal resistance, and a method for manufacturing the same.

2. Description of Related Art

A conventional rechargeable battery module made by connecting a plurality of cells together, each having an individual cell case, has a problem that the connection path between the cells is long and the number of connection points is large and each of the connection points has small cross-sectional area, thereby increasing the component resistance leading to the increase of internal resistance thereof.

In consideration of the aforementioned conventional problem, the inventors of this invention have proposed a prismatic battery module 100 including a plurality of cells 2 as shown in FIGS. 12 and 13. Reference numeral 3 denotes a prismatic battery case constructed in such a manner that a plurality of prismatic cell cases 4 of cells 2, each cell case having short lateral walls and long lateral walls, are integrally connected together in series, and each pair of cell cases shares short lateral walls thereof as a separation wall 5, and further, an upper opening of each of the cell cases is closed by a unitary lid 6. In the upper portions of outer short lateral walls of the outermost cell cases and the separation wall 5 between the adjacent cell cases 4 are formed connection holes 7. Within each of the cell cases 4, an electrode plate group 8 constructed by alternately stacking rectangular positive and negative electrode plates interposing a separator therebetween is accommodated together with an electrolyte. The positive and the negative electrode plates constituting the electrode plate group 8 project from the electrode plate group in opposite directions to form a lead portion 9a of the positive electrode plate and a lead portion 9b of the negative electrode plate, respectively. To the side ends of the lead portions 9a, 9b are connected collector plates 10a, 10b, respectively, by welding or the like.

In the upper portions of the collector plates 10a, 10b are formed connection projections 11 to be fitted into the connection holes 7, and the connection projections 11 of the collector plates 10a, 10b as positive and negative poles respectively are connected to each other between the adjacent cell cases 4 by welding. Furthermore, in the connection holes 7 of the outer short lateral walls of the outermost cell cases 4 are mounted connection terminals 12 as either a positive or negative pole, and a connection projection 13 of the connection terminal 12 and the connection projection 11 of either the collector plate 10a or 10b are connected to each other by welding. Thus, a plurality of cells 2 accommodated in the prismatic battery case 3 are connected together in series.

Additionally, in the lid 6 are provided a communication path 14 for balancing the internal pressure between the cell cases 4, a safety vent (not shown) for discharging the pressure when the internal pressure of the cell case 4 exceeds a predetermined value and a sensor fixing hole 15 for fixing a temperature sensor thereto to detect the temperature of the cell 2.

According to the above-described construction of battery, since the electrical communication path from the positive and negative electrode plates of the electrode plate group 8 to the respective lead portions 9a, 9b is short and further the adjacent lead portions 9a, 9b of the associated electrode plate groups are connected to each other via the associated collector plate 10a, 10b within the prismatic battery case 3, the connection path between the electrode plate groups is short and the number of connection points is small, thereby allowing the prismatic battery module to reduce the component resistance included therein and in proportion thereto, reduce the internal resistance.

However, although the prismatic battery module 100 shown in FIGS. 12 and 13 is constructed so that the connection path from the positive and negative electrode plates to the respective collector plates 10a, 10b via the respective lead portions 9a, 9b is short, as is denoted by arrows in FIG. 14, the adjacent collector plates 10a, 10b of the associated electrode plate groups are connected at one point of both ends of the connection projections 11 located at the upper portions of the adjacent collector plates by welding and therefore, there have been seen problems that the entire connection path between the adjacent electrode plate groups becomes longer and in addition, the internal resistance between the cells becomes higher since the electrical communication between the adjacent collector plates is performed at only one point. Furthermore, there have also been seen problems that the collector plates 10a, 10b employed in the battery 100 increases the manufacturing cost of battery correspondingly, and further, it is necessary to arrange the collector plates 10a, 10b on both sides of the electrode plate group 8 and to form the upper portion of the collector plates 10a, 10b so as to project beyond the upper end of the electrode plate group 8, thereby forcing enlargement of the volume of the cell case 4.

SUMMARY OF THE INVENTION

In consideration of the above problems seen in the conventional technique, an object of the present invention is to provide a prismatic battery module in which the internal resistance per cell is reduced, and a method for manufacturing the same.

A prismatic battery module according to a first aspect of the invention includes a prismatic battery case constructed by connecting a plurality of prismatic cell cases together in series, each pair of cell cases sharing a separation wall; an electrode plate group formed by alternately stacking positive and negative electrode plates interposing a separator therebetween and further forming lead portions by projecting one side portion of the positive electrode plates and one side portion of the negative electrode plates in opposite directions, respectively; and collectors connected to the lead portions on both sides of the electrode plate group, in which the prismatic battery module is further constructed such that adjacent electrode plate groups are connected to each other by connecting adjacent collectors to each other through a connection aperture formed in a central portion of the separation wall and a sealing material is applied to each space between each of the separation walls around the connection aperture and each of the collectors. As the adjacent collectors are connected through the connection aperture formed in the central portion of the separation wall, the electrical communication path between the electrode plate groups becomes shorter allowing the reduction of the internal resistance and the upper portion of the collector is not required to project from the electrode plate group, resulting in the volume reduction of prismatic battery case.

A prismatic battery module according to a second aspect of the invention includes a prismatic battery case having a single internal space therein; an electrode plate group formed by alternately stacking positive and negative electrode plates interposing a separator therebetween and further forming lead portions by projecting one side portion of the positive electrode plates and one side portion of the negative electrode plates in opposite directions, respectively; and collectors connected to the lead portions on both sides of the electrode plate group, in which the prismatic battery module is further constructed such that a plurality of electrode plate groups are connected together by connecting adjacent collectors of adjacent electrode plate groups to each other and arranging the plurality of electrode plate groups alongside in series within the prismatic battery case, and the single internal space is partitioned into a plurality of cell cases by applying a sealing material to each space between outer periphery of the adjacent collectors connected to each other and a wall surface of the prismatic battery case. As the plurality of electrode plate groups are connected to each other via the entire surface of the adjacent collectors respectively, the electrical communication path between the electrode plate groups becomes shorter allowing the extensive reduction of the internal resistance of cell. In the above-described construction of battery, the plurality of electrode plate groups, which are integrally connected together in series, are disposed in the prismatic battery case and further, each outer periphery of the adjacent collectors is sealed by a sealing material, thereby forming sealed cell cases for electrode plate groups respectively.

A prismatic battery module according to a third aspect of the invention includes a prismatic battery case constructed by connecting a plurality of prismatic cell cases together in series, each pair of cell cases sharing a separation wall; an electrode plate group formed by alternately stacking positive and negative electrode plates interposing a separator therebetween and further forming lead portions by projecting one side portion of the positive electrode plates and one side portion of the negative electrode plates in opposite directions, respectively; collectors connected to the lead portions on both sides of the electrode plate group; and an electroconductive plate provided in at least one sidewall of the prismatic battery case and facing adjacent cell cases, in which the electroconductive plate is connected to adjacent collectors of adjacent electrode plate groups. As entire surface of one side portion or both side portions of adjacent collectors is connected together via the electroconductive plate, the electrical communication path between the electrode plate groups becomes shorter allowing the reduction of the internal resistance of cell and further, the upper portion of the collector is not required to project from the electrode plate group, resulting in the volume reduction of prismatic battery case.

A prismatic battery module according to a fourth aspect of the invention includes a prismatic battery case constructed by connecting a plurality of prismatic cell cases together in series, each pair of cell cases sharing a separation wall; an electrode plate group formed by alternately stacking positive and negative electrode plates interposing a separator therebetween and further forming lead portions by projecting one side portion of the positive electrode plates and one side portion of the negative electrode plates in opposite directions, respectively; a plurality of connecting rods formed so as to penetrate the lead portions on both sides of the electrode plate group, respectively; and an electroconductive plate provided in at least one sidewall of the prismatic battery and facing adjacent cell cases, in which each of the plurality of connecting rods and the electroconductive plate are connected to each other. As at least one of both end portions of the plurality of connecting rods penetrating the lead portions of the electrode plate group connects the lead portions of adjacent electrode plate groups to each other via the electroconductive plate, the electrical communication path between the electrode plate groups becomes shorter allowing the reduction of the internal resistance of cell and further, the upper portion of the collector is not required to project upwardly from the electrode plate group, resulting in the volume reduction of prismatic battery case.

A prismatic battery module according to a fifth aspect of the invention includes a prismatic battery case constructed by connecting a plurality of prismatic cell cases together, the plurality of cell cases being arranged alongside one by one in addition to being spaced apart from each other and being constructed in such a manner that one of both ends of one of the cell cases and one of both ends of another one of the cell cases adjacent to the one of the cell cases are spatially connected to each other through a communicating space at a position of a connection portion to thereby form a zigzag chain of the plurality of cell cases; an electrode plate group formed by alternately stacking positive and negative electrode plates interposing a separator therebetween and further forming lead portions by projecting one side portion of the positive electrode plates and one side portion of the negative electrode plates in opposite directions, respectively; and an electroconductive plate for providing electrical communication between a plurality of electrode plate groups by connecting the plurality of electrode plate groups together in such a manner that one of both lead portions of one of adjacent electrode plate groups and one of both lead portions of the other of the electrode plate groups are connected via the electroconductive plate to thereby form a zigzag chain of the plurality of electrode plate groups, the zigzag chain of the electrode plate groups being arranged alongside so as to have the same pitch as that of an arrangement of the plurality of cell cases, in which the plurality of electrode plate groups connected together via associated electroconductive plates are disposed in the prismatic battery case and each space between the electroconductive plate and the prismatic battery case at the connection portion between the cell cases is sealed with a sealing material. As the adjacent collectors of the associated electrode plate groups are connected to each other via the electroconductive plate over the entire surface of the collectors, the electrical communication path between the electrode plate groups becomes shorter allowing the reduction of the internal resistance, and further, each space between the prismatic battery case and the electroconductive plate at the connection portion between the cell cases is sealed by the sealing material, whereby the cell cases are isolated from each other and further, the space between the cell cases can be utilized as a coolant passage, resulting in the achievement of high cooling performance of prismatic battery module.

A prismatic battery module according to a sixth aspect of the invention includes a prismatic battery case constructed by connecting a plurality of prismatic cell cases together, the plurality of cell cases being arranged alongside one by one in addition to being spaced apart from each other and being constructed in such a manner that one of both ends of one of the cell cases and one of both ends of another one of the cell cases adjacent to the one of the cell cases are connected to each other to thereby form a zigzag chain of the plurality of cell cases; an electrode plate group formed by alternately stacking positive and negative electrode plates interposing a separator therebetween and further forming lead portions by projecting one side portion of the positive electrode plates and one side portion of the negative electrode plates in opposite directions, respectively; collectors connected to the lead portions on both sides of the electrode plate group; and an electroconductive plate provided in a cell case connection portion of the prismatic battery case and facing adjacent cell cases, in which the electroconductive plate provides electrical connection between adjacent collectors of associated electrode plate groups. As the adjacent collectors of the associated electrode plate groups are connected to each other via the electroconductive plate over the entire surface of the collectors, the electrical communication path between the electrode plate groups becomes shorter allowing the reduction of the internal resistance of cell, and further, the space between the cell cases can be utilized as a coolant passage, resulting in the achievement of high cooling performance of prismatic battery module.

A prismatic battery module according to a seventh aspect of the invention includes a prismatic battery case constructed by connecting a plurality of prismatic cell cases together in series, via associated separation walls made of a crank-shaped electroconductive plate, each of the separation walls having connection surfaces being arranged along a direction of an arrangement of the cell cases in addition to being formed in a central portion in a width direction of the cell case; an electrode plate group formed by alternately stacking positive and negative electrode plates interposing a separator therebetween and further forming lead portions by projecting one side portion of the positive electrode plates and one side portion of the negative electrode plates in opposite directions, respectively; and collectors connected to the lead portions on both sides of the electrode plate group, in which the prismatic battery case accommodates the plurality of cell cases such that associated parts of adjacent collectors of adjacent electrode plate groups, the adjacent electrode plate groups being disposed in adjacent cell cases, faces each other interposing the connection surfaces therebetween and the adjacent collectors are connected to each other by welding the adjacent collectors to associated connection surfaces interposing the associated connection surfaces therebetween. As the adjacent collectors are connected via the crank-shaped electroconductive plate constituting the separation wall between the cell cases, the electrical communication path between the electrode plate groups becomes shorter allowing the reduction of the internal resistance of cell and the upper portion of the collector is not required to project upwardly from the electrode plate group, resulting in the achievement of corresponding volume reduction of prismatic battery case.

A method for manufacturing a prismatic battery module according to an eighth aspect of the invention, includes the steps of: forming a prismatic battery case having a plurality of cell cases therein, the plurality of cell cases being connected together in series via associated separation walls and connection apertures, each connection aperture being located in a central portion of each of the separation walls; forming an electrode plate group having positive and negative electrode plates therein so as to project lead portions of the positive and negative electrode plates therefrom on both sides thereof; connecting collectors to the lead portions of the electrode plate group; and disposing the electrode plate group in the cell case in such a manner that adjacent collectors of associated electrode plate groups are connected to each other via each of the connection apertures and at the same time, each space formed around the adjacent collectors is sealed.

A method for manufacturing a prismatic battery module according to a ninth aspect of the invention, includes the steps of: forming a prismatic battery case having a space for forming a plurality of prismatic cell cases therein; forming an electrode plate group having positive and negative electrode plates therein so as to project lead portions of the positive and negative electrode plates therefrom on both sides thereof; connecting collectors to the lead portions of the electrode plate group; connecting a plurality of electrode plate groups together, via adjacent collectors of associated electrode plate groups; and disposing the plurality of electrode plate groups, the plurality of electrode plate groups being integrally connected together in series, in the prismatic battery case in a state of individual opposing portions consisting of the adjacent collectors and an inner wall of the prismatic battery case interposing a sealing material therebetween.

A method for manufacturing a prismatic battery module according to a tenth aspect of the invention, includes the steps of: forming a prismatic battery case having a plurality of cell cases integrally therein and an electroconductive plate facing adjacent cell cases in addition to being located between adjacent end portions of the adjacent cell cases; forming an electrode plate group having positive and negative electrode plates therein so as to project lead portions of the positive and negative electrode plates therefrom on both sides thereof; connecting one of collectors and connecting rods to the lead portions of the electrode plate group; and a step for inserting the electrode plate group in the cell case and connecting selected one from the collectors and the connecting rods to the electroconductive plate.

A method for manufacturing a prismatic battery module according to an eleventh aspect of the invention, includes the steps of: forming a prismatic battery case having a single internal space therein; forming an electrode plate group having positive and negative electrode plates therein so as to project lead portions of the positive and negative electrode plates therefrom on both sides thereof; connecting electroconductive plates to the lead portions of the electrode plate group and integrally connecting a plurality of electrode plate groups together in series via the electroconductive plates; and disposing the plurality of electrode plate groups in the prismatic battery case in a state of individual opposing portions consisting of each of the electroconductive plates and an inner wall of the prismatic battery case interposing a sealing material therebetween, thereby partitioning the internal space into a plurality of cell cases.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIGS. 1A and 1B illustrate a first embodiment of a prismatic battery module of the present invention, FIG. 1A is a front view of an electrode plate group with one collector connected thereto, and FIG. 1B is a primary longitudinal sectional/front view of the prismatic battery module in a state indicating that the electrode plate groups are inserted in associated cell cases of a prismatic battery case and connected to each other;

FIG. 2A is a primary plan view of the prismatic battery module in a state indicating that a plurality of electrode plate groups are connected together in series, and FIG. 2B is a primary horizontal sectional/plan view of the prismatic battery module in a state indicating that the electrode plate groups are inserted in a prismatic battery case;

FIG. 3A is a primary longitudinal sectional/front view, FIG. 3B is a primary longitudinal sectional/side view, and FIG. 3C is a primary horizontal sectional/plan view of the prismatic battery module;

FIG. 4A is a primary horizontal sectional/plan view of the prismatic battery module, and FIG. 4B is an enlarged view of a part denoted by "IVB" in FIG. 4A;

FIG. 5A is a primary horizontal sectional/plan view of the prismatic battery module, and FIG. 5B is an enlarged view of a part denoted by "VB" in FIG. 5A;

FIG. 6A is a primary horizontal sectional/plan view of the prismatic battery module, and FIGS. 6B and 6C are enlarged views of parts denoted by "VIB" and "VIC" in FIG. 6A, respectively;

DETAILED DESCRIPTION OF THE PREFERRED EMBODIMENTS

[First Embodiment]

Figure 12:
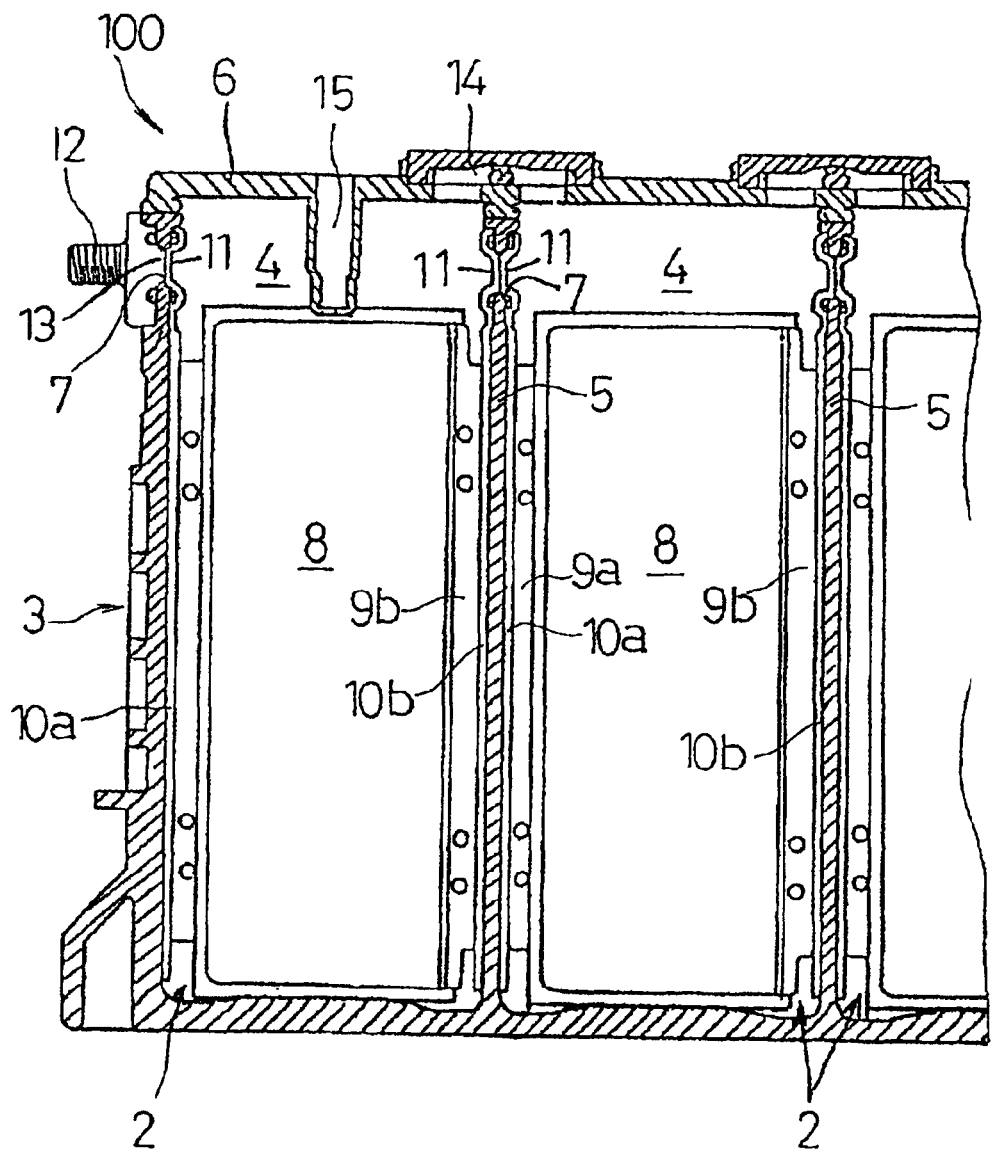
FIG. 12 illustrates a part of a longitudinal sectional and front view of a conventional prismatic battery module.
Figure 13:
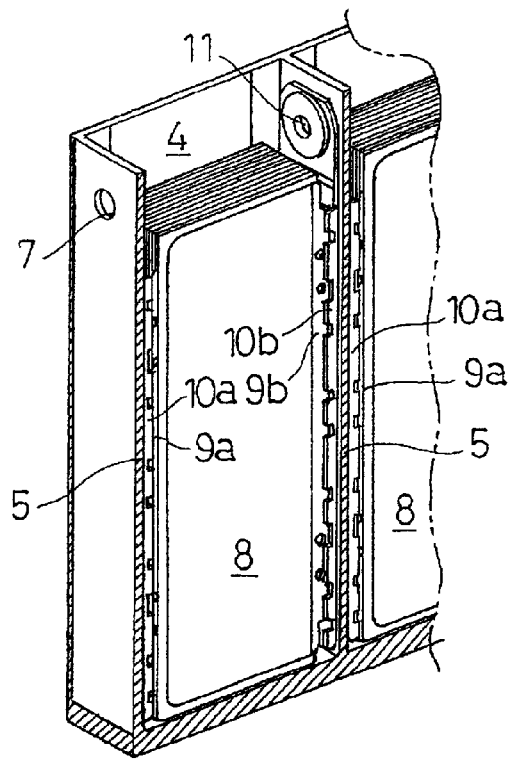
FIG. 13 is a perspective partly-broken view of the conventional prismatic battery module of FIG. 12.
Figure 14:
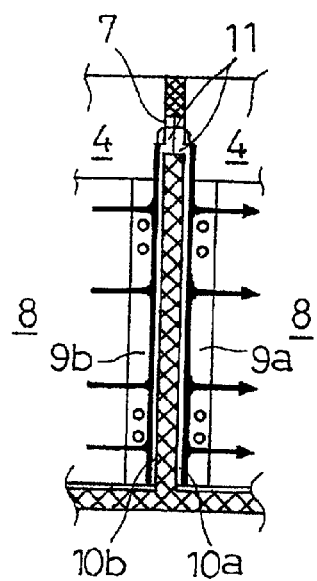
FIG. 14 is an explanatory view of the conventional prismatic battery module of FIG. 12 showing electrical communication paths.

A first embodiment of the prismatic battery module of the present invention will be explained below with reference to FIGS. 1A and 1B. Note that in the accompanying explanation, the same parts and elements as those explained by referring to FIGS. 12 and 13 are denoted by the same numerals, and therefore, the explanation will primarily be performed focusing on the points different from the conventional technique.

As shown in FIG. 1, a prismatic battery case 3 of this embodiment is constructed such that a plurality of prismatic cell cases 4 are integrally connected together in series, each cell case having short lateral walls and long lateral walls, and each pair of cell cases shares short lateral walls thereof as a separation wall 5 and further, a connection aperture 19 is formed in the central portion of the separation wall 5.

An electrode plate group 8 is formed as follows: a plurality of positive and negative electrode plates are stacked alternately; and at the same time, each positive electrode plate is covered by a bag-shaped separator having an opening in a lateral direction; and thus, the electrode plate group is formed of the stacked positive and negative electrode plates interposing the associated separators therebetween; and further, side portions of the positive and negative electrode plates are formed projecting from the electrode plate group in opposing directions to form lead portions 9 for positive and negative poles, respectively. The positive electrode plate is made such that a Ni foamed metal is plated with nickel hydroxide excluding the area for the lead portion 9 and the lead portion 9 of the Ni foamed metal is formed by pressing the Ni foamed metal to compress the same, and at the same time, attaching a lead plate on one surface of the Ni foamed metal by seam welding via ultrasonic welding. Furthermore, the negative electrode plate is made such that a Ni punched metal is coated with a paste including hydrogen-occluding alloy excluding the area for the lead portion 9.

To the lead portions 9 on both sides of the electrode plate group 8 are connected collectors 10. The collector 10 is constructed such that in the central portion thereof, a connection projection 16 having a lateral height approximately equal to half of the thickness of the separation wall 5 is formed so as to project beyond the area of the collector excluding the connection projection and to be fitted into the connection aperture 19 formed in the separation wall 5, and further, the surface of the connection projection is coated with an electroconductive adhesive 17, and still further, a sealing material 18 such as a pitch is annually filled in the space around the connection projection 16.

The electrode plate group 8 is disposed in each cell case 4 and further the connection projection 16 of the collector 10 is fitted into the connection aperture 19, and then, connected to the electrode plate group 8 disposed in the adjacent cell case 4 via the connection projection 16 of the collector 10 and the electroconductive adhesive 17. Filling the sealing material 18 in each space formed between the collector 10 around the connection projection 16 and the separation wall 5 seals the connection projection 16 and as a result, the cell cases 4 are closed, thereby constructing the cells 2.

Subsequently, the electrolyte is poured into the cell case 4 and thereafter, the opening of the cell case 4 is closed by the lid, thereby completing the prismatic battery module 1.

According to the above-described construction, the electrical communication path between the electrode plate groups 8 becomes shorter and the connection resistance between the cells 2 is reduced, thereby allowing the prismatic battery module 1 to reduce the internal resistance per cell 2. Furthermore, the upper portion of the collector 10 is formed so as not to project upwardly from the electrode plate group 8 and therefore, the volume of the cell case 4 is reduced, leading to the volume reduction of the prismatic battery case 3.

[Second Embodiment]

Figure 2A:
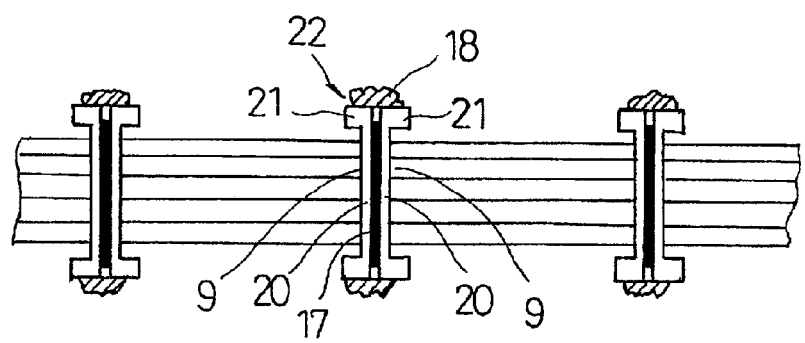
FIGS. 2A and 2B illustrate a second embodiment of the prismatic battery module of the invention.

Subsequently, a second embodiment of the prismatic battery module according to the invention will be explained with reference to FIGS. 2A and 2B. Note that in the accompanying explanation, the same parts and elements as those explained in the foregoing embodiment are denoted by the same numerals for preventing the repeated explanation, and therefore, the explanation will primarily be performed focusing on the points different from the foregoing embodiment.

A prismatic battery case 30 in this embodiment does not include the separation wall 5 between the cell cases 4 employed in the first embodiment and includes a single space 31 formed by connecting a plurality of cell cases 4 together in series, and further, T-slots 32, each having a T-shaped cross section, in both walls between the later-formed cell cases 4, each of the both walls being located corresponding to the portion of the separation wall in the first embodiment.

Collector plates 20, each having L-flanges 21 formed on both sides thereof, are connected to lead portions 9 formed on both sides of an electrode plate group 8. As shown in FIG. 2A, a plurality of electrode plate groups 8 are arranged alongside one by one so that the adjacent collectors 20 of the associated electrode plate groups are disposed facing each other and the adjacent collectors 20 are bonded together via the electroconductive adhesive 17. Furthermore, on the outer surface of a T-shaped portion 22 consisting of the bonded L-flanges 21 of the adjacent collectors 20 connected to each other is coated a sealing material 18 such as a pitch.

Figure 2B:
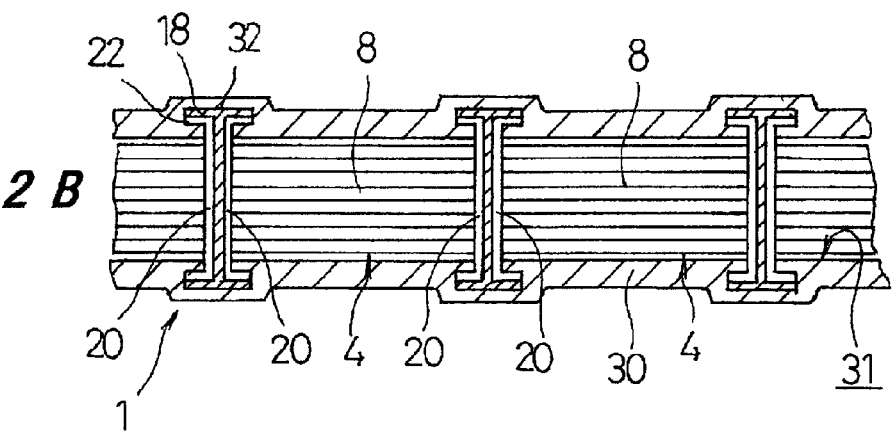

As shown in FIG. 2B, the integrally connected electrode plate groups 8 are disposed in the space 31 of the prismatic battery case 30 in such a manner that the T-shaped portion 22 is tightly inserted into the T-slot 32. Accordingly, a plurality of electrode plate groups 8 are connected together in series one by one via the associated collectors 20, and at the same time, the sealing material 18 is filled in each space between each of the outer surfaces of the connected collectors 20 and each of the sidewalls of the prismatic battery case 30, and thus, the space 31 is partitioned into a plurality of cell cases 4 by the associated collectors 20. The electrolyte is then poured into the cell case 4 and thereafter, the opening of the cell case 4 is closed by the lid, thereby completing the prismatic battery module 1.

Thus, the electrical communication path between the adjacent electrode plate groups 8 becomes shorter and therefore, the internal resistance is extremely reduced. Furthermore, the single space 31 is partitioned into the plurality of cell cases 4 corresponding to the respective electrode plate groups 8 by the associated sealing materials 18 formed on the outer peripheries of the collectors 20. In this case, the operation for connecting the adjacent collectors 20 together is performed in a highly effective manner. In addition, as the T-shaped portions 22 on both sides of the adjacent collectors 20 are tightly fitted into the associated T-slots 32, the sealing formed between the adjacent collectors 20 and the sidewalls of the prismatic battery case 30 is easily secured and the phenomenon that the sidewalls of the prismatic battery case 30 are expanded by the internal pressure generated within the cell cases 4 is prevented, thereby securely preventing the seal member from being broken.

Figure 3A:
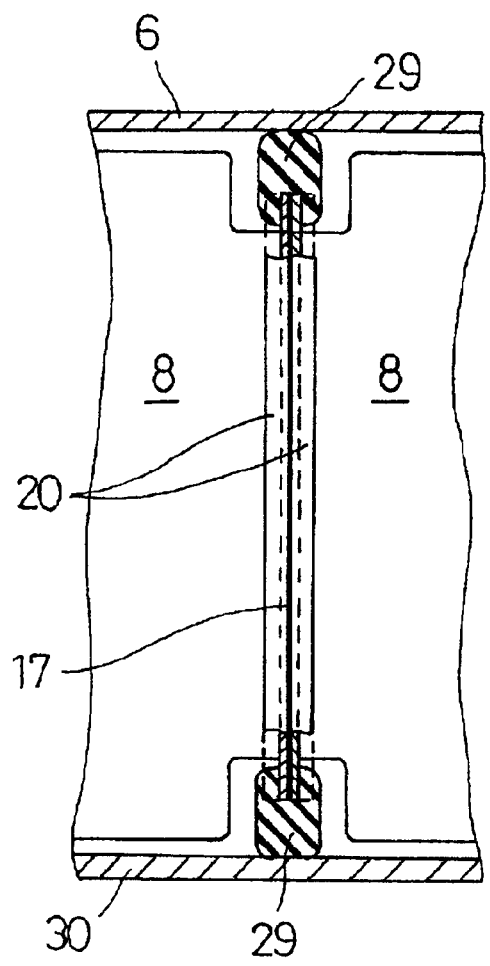
FIGS. 3A, 3B, and 3C illustrate the first modified example of the second embodiment.
Figure 3B:
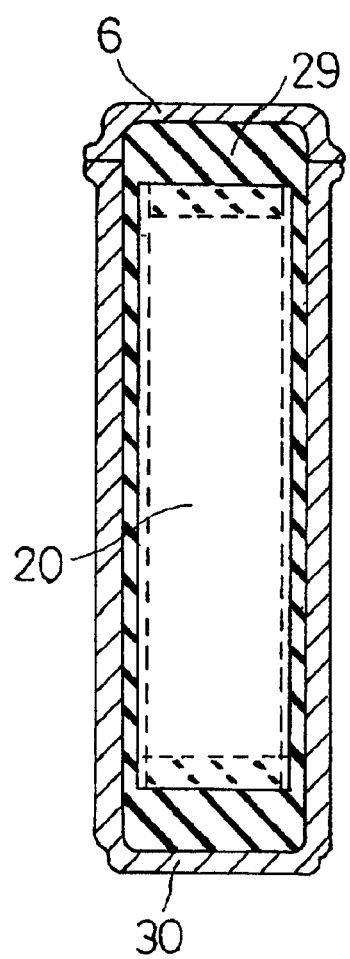
Figure 3C:
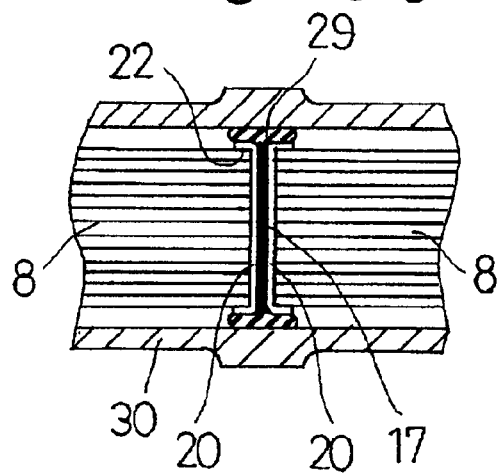

Various modified examples of this embodiment will be explained below. In the first modified example shown in FIGS. 3A through 3C, instead of the construction employed in the second embodiment that the sealing materials 18 are coated on the outer side surfaces of the T-shaped portions 22 located on both sides of the adjacent collectors 20, a seal rubber 29 is baked fixedly on the whole outer periphery of adjacent collectors 20 and the outer peripheral portion of the seal rubber 29 is pressed against the inner walls of a prismatic battery case 30 and a lid 6 to secure the sealing between cell cases. This construction allows the battery case to have no T-slot 32 therein and therefore, the highly reliable sealing is secured while reducing the manpower for assembling. The seal rubber 29 is baked fixedly on both side surfaces of the adjacent collectors 20 in addition to the outer periphery thereof at both upper and bottom ends thereof so as to wrap the end portions thereof from the edge of the upper and bottom of the adjacent collectors 20, and is also baked fixedly on the outer surface of the T-shaped portion 22.

It should be noted that instead of the above-described sealing operation, the sealing may be performed as follows: first, connect the lead portions 9 of the electrode plate group 8 to the associated collectors 20 that have the seal rubber 29 previously baked on the outer peripheries thereof; and then, bond the associated collectors 20 of the adjacent electrode plate groups 8 together using the electroconductive adhesive 17; and thereafter, insert a plurality of above electrode plate groups 8 connected together following the above-described assembling operation in the prismatic battery case 30. The space between the cell cases 4 is thereby sealed doubly.

Figure 4A:
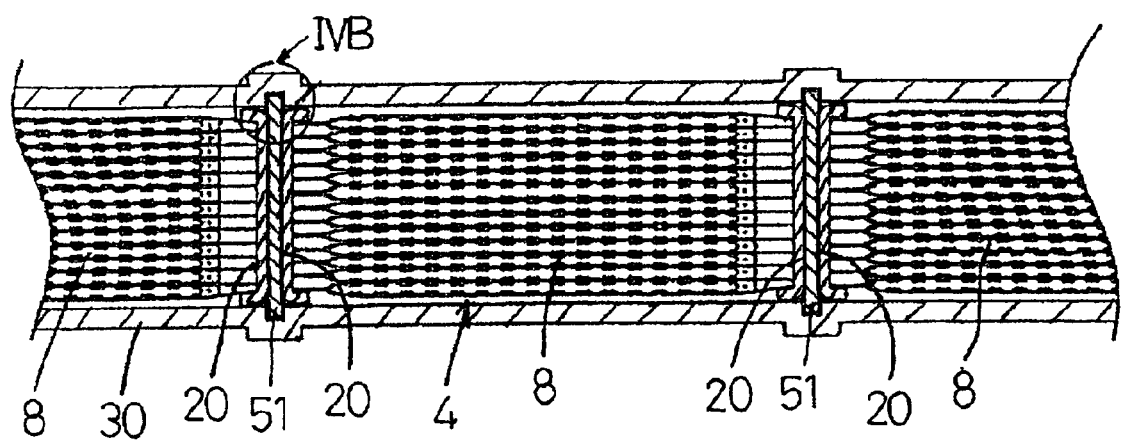
FIGS. 4A and 4B illustrate the second modified example of the second embodiment.
Figure 4B:
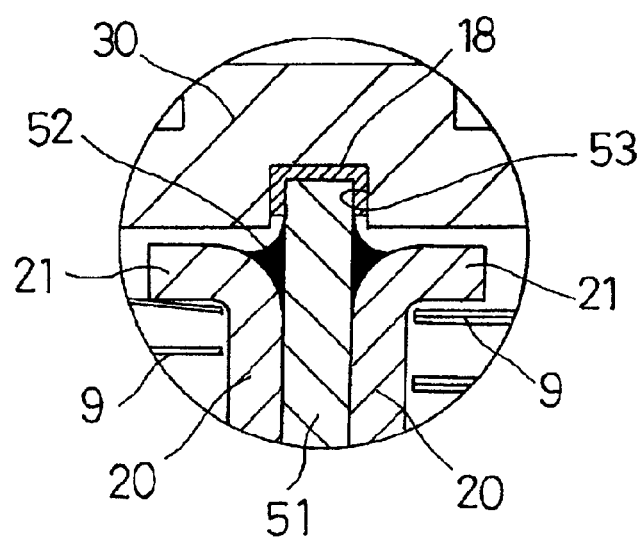

In the second modified example of the second embodiment shown in FIGS. 4A and 4B, instead of employing the electroconductive adhesive 17 to bond the collectors 20 together, an electroconductive plate 51 having a width wider than that of the collector 20 is interposed between the adjacent collectors 20 while contacting the adjacent collectors and at the same time, both edges of the adjacent collector 20 and both ends of the electroconductive plate 51 projecting therefrom are welded together respectively by fillet welding 52. Furthermore, both ends of the electroconductive plate 51 are inserted into seal slots 53 formed in the inner surfaces of the prismatic battery case 30 and at the same time, sealing materials 18 such as a pitch are filled in the spaces formed in the seal slots, thereby completing the sealing between the cell cases 4. This construction allows the highly reliable connection together with the low resistance between the cells. Note that instead of the sealing operation performed by using the sealing materials 18, the sealing may be secured by baking seal rubbers on both ends of the electroconductive plate 51 and pressing the seal rubbers against the inner wall of the prismatic battery case 30.

Figure 5A:
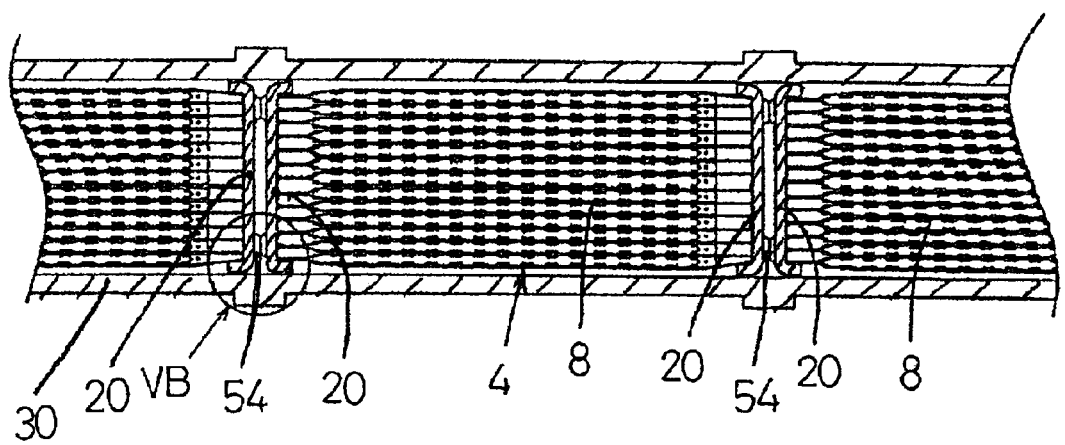
FIGS. 5A and 5B illustrate the third modified example of the second embodiment.
Figure 5B:
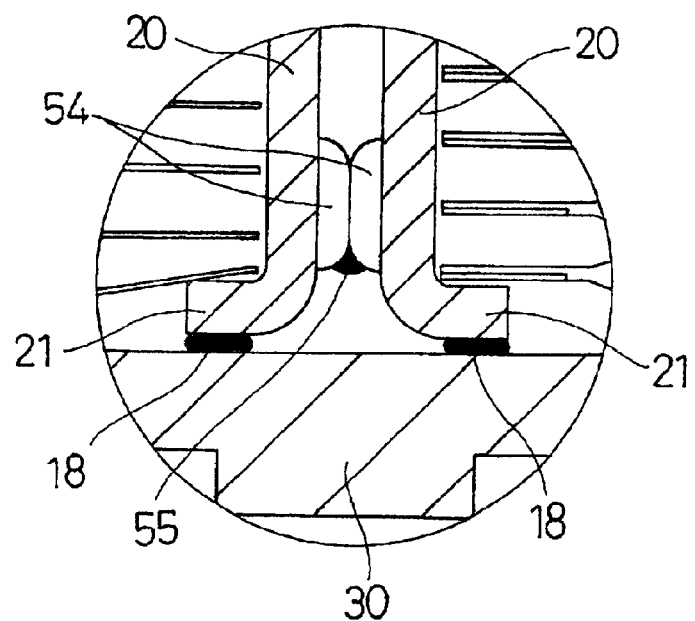

In the third modified example of the second embodiment shown in FIGS. 5A and 5B, instead of employing the electroconductive adhesive 17, connection projections 54 are formed projecting laterally on both sides of the collector 20 and the connection projections 54, which are to be connected to each other, of the adjacent collectors 20 are disposed so as to face each other and then welded together by welding 55 the outer surfaces of the connection projections using electron beam or laser beam. Furthermore, each space between the outer surface of each of the L-flanges 21 of the collector 20 and the inner wall of the prismatic battery case 30 is filled with a sealing material 18 such as a pitch to isolate the cell cases 4 from each other. This construction allows the highly reliable connection in addition to the low resistance between the cells. Note that instead of using the seal material 18, the sealing may be secured by baking seal rubbers on the outer surfaces of the L-flanges 21 of the collector 20 and pressing the seal rubbers against the inner wall of the prismatic battery case 30.

Figure 6A:
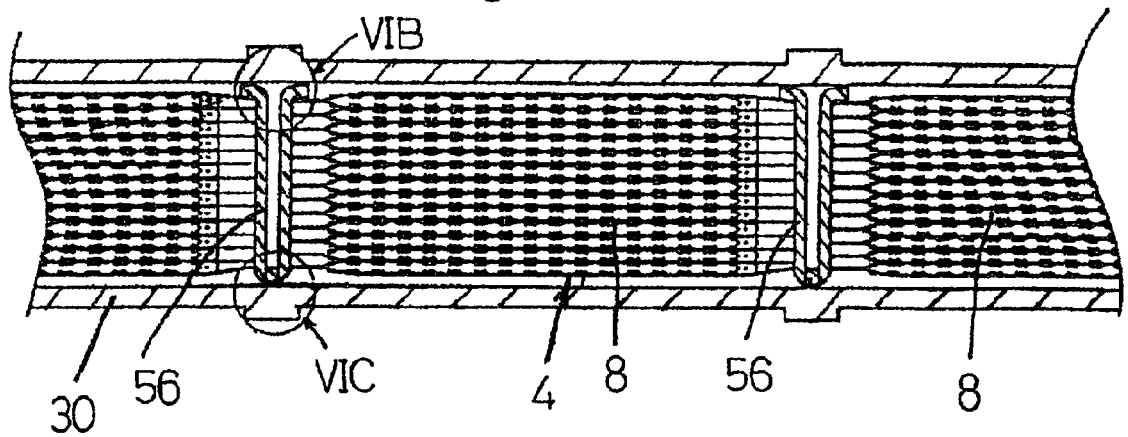
FIGS. 6A, 6B, and 6C illustrate the fourth modified example of the second embodiment.
Figure 6B:
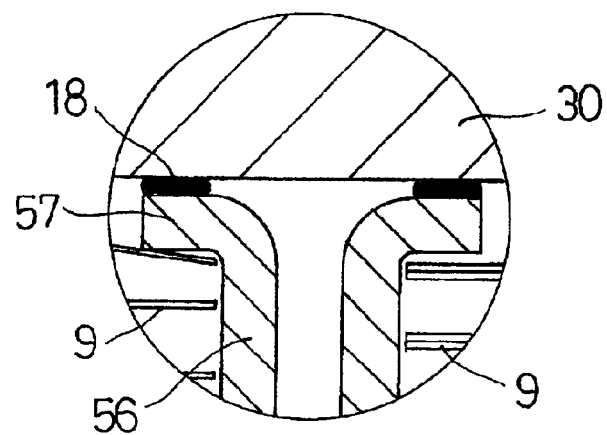
Figure 6C:
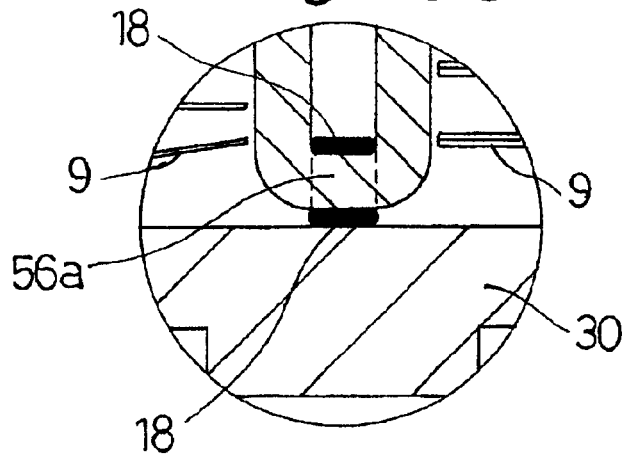

In the fourth modified example of the second embodiment shown in FIGS. 6A through 6C, instead of the collector 20 employed in the second embodiment, a U-shaped collector 56 having L-flanges 57 at its both ends, the L-flanges having distal ends facing toward the respective directions opposite to each other, is employed, and lead portions 9 of electrode plate groups 8 located on both sides of the U-shaped collector 56 are connected thereto. Note that the process for manufacturing the U-shaped collector is performed as follows: first, prepare a plate-shaped collector having the L-flanges 57 at its both ends; and then, weld the lead portions of the electrode plate groups 8, which will be disposed adjacent to each other in the following manufacturing process, to the plate-shaped collector by beam welding or the like; and thereafter, bend the collector in a U-form; and thus, complete the U-shaped collector 56 having the electrode plate groups 8 connected easily thereto on both sides thereof. In this construction employing the U-shaped collector, the adjacent electrode plate groups 8 are welded via only one collector 56, thereby allowing the highly reliable connection together with the low resistance between the cells and further the reduction of the number of parts to be employed, resulting in the reduction of manufacturing cost.

Thereafter, each space between each of the outer surfaces of the L-flanges 57 of the U-shaped collectors 56 and the inner wall of a prismatic battery case 30, as well as each space between each of the outer/inner surfaces of bent portions 56a of the U-shaped collectors 56 and the inner wall of the prismatic battery case 30 are filled with sealing materials 18 such as a pitch, thereby completing the sealing between the cell cases 4. Note that forming the sealing material 18 also on the inner surface of a bent portion 56a prevents ions from moving along the inner surface of the U-shaped collector 56. Also in this modified example, instead of using the seal material 18, the sealing may be secured by baking seal rubbers on each of the outer surfaces of the L-flanges 57 and each of the outer/inner surfaces of bent portions 56a of the collectors 56 and pressing the seal rubbers against the inner wall of the prismatic battery case 30.

[Third Embodiment]

Figure 7A:
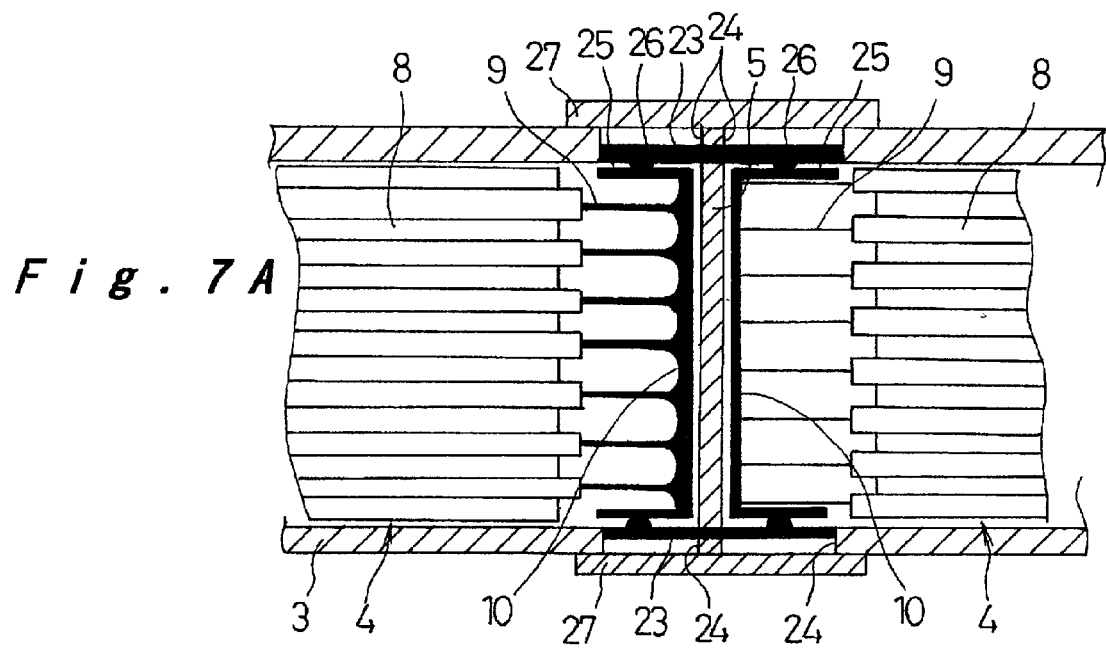
FIGS. 7A and 7B illustrate a third embodiment of the prismatic battery module of the invention and FIGS. 7A and 7B are a primary horizontal sectional/plan view of the prismatic battery module and a partly omitted front view of FIG. 7A, respectively.
Figure 7B:
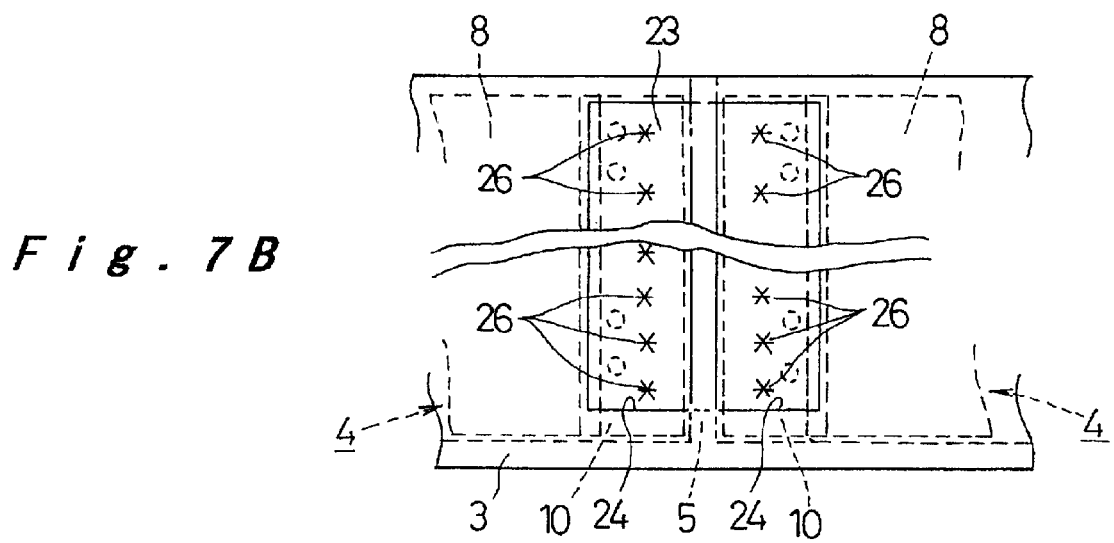

Subsequently, a third embodiment of the prismatic battery module according to the invention will be explained with reference to FIGS. 7A and 7B.

In this embodiment, electroconductive plates 23 are provided through the portions of a separation wall 5 located at both sidewalls of a prismatic battery case 3 so as to face adjacent cell cases 4 by means of insert-molding. In the prismatic battery case 3 are formed working openings 24 for exposing the electroconductive plates 23 toward outside. Each of collectors 10 connected to lead portions 9 on both sides of an electrode plate groups 8 is formed to have a cross sectional view like a horseshoe, and connecting strips 25 bent in a L-shaped form at both ends of the collector are made to contact the electroconductive plates 23 and are connected thereto via a plurality of welding portions 26 provided to have a suitable space from each other. The welding portions 26 are welded to bond the connecting strip 25 and the electroconductive plate 23 together by resistance welding or soldering. Furthermore, the working openings 24 are closed by and sealed with a closing plate 27.

The prismatic battery module 1 is manufactured as follows: first, insert the electrode plate groups 8 each having the collectors 10 connected thereto on both sides thereof in the prismatic battery case 3; and bring the connecting strips 25 of each of the collectors 10 into contact with the associated electroconductive plates 23; and then, supply welding current between the associated electroconductive plates 23 by placing welding electrodes on a plurality of points of the associated electroconductive plates 23, the plurality of points being spaced from each other, through the working openings 24 located on both sides of the battery case, thereby completing the welding between the connecting strips 25 and the electroconductive plates 23 by means of resistance welding or soldering; and after completing the welding, seal the working openings 24 with the closing plates 27; and finally, introduce an electrolyte into each cell case 4 formed between the collectors 20 and then, close the openings of the cell cases 4 by a lid.

According to this embodiment, as both end portions of adjacent collectors 10 are respectively connected to each other via the associated electroconductive plates 23 over the whole area of the end portions, the electrical communication path between the electrode plate groups 8 becomes shorter realizing the reduction of the internal resistance and the upper portion of the collector is not required to project from the electrode plate group, thereby achieving the volume reduction of prismatic battery case.

It should be noted that in this embodiment, although the electroconductive plate 23 and the collector 10 are connected by welding, the both may be bonded by using an electroconductive adhesive. In addition, although the electroconductive plates 23 are provided in both sidewalls of the battery case, it may be allowed that only one electroconductive plate is provided in one of both sidewalls of the battery case.

[Fourth Embodiment]

Figure 8A:
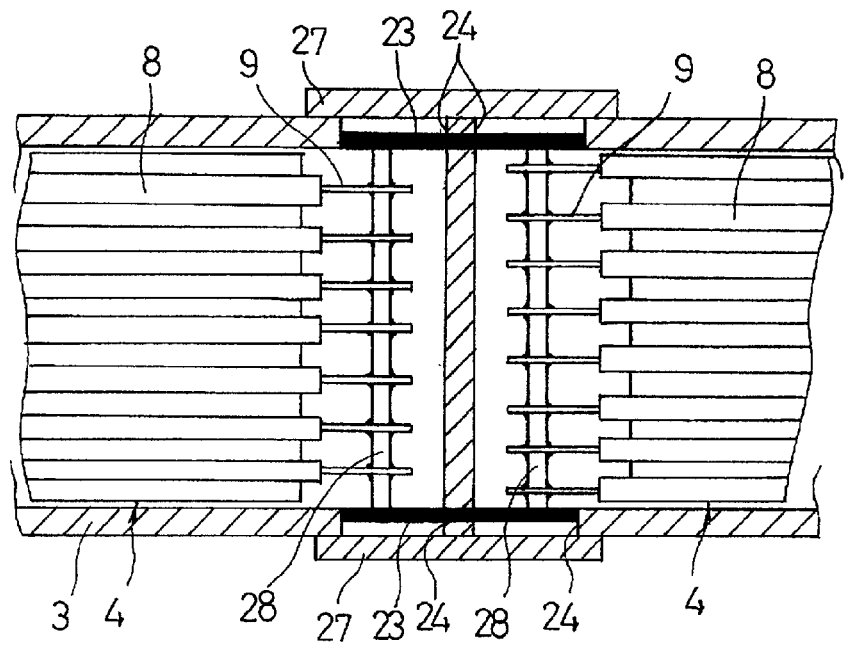
FIGS. 8A and 8B illustrate a fourth embodiment of the prismatic battery module of the invention and FIGS. 8A and 8B are a primary horizontal sectional/plan view of the prismatic battery module and a partly omitted front view of FIG. 8A, respectively.
Figure 8B:
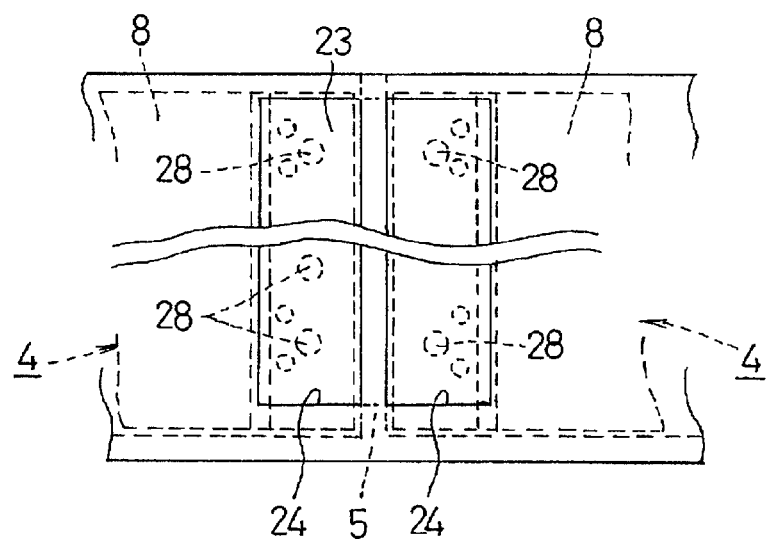

Subsequently, a fourth embodiment of the prismatic battery module according to the invention will be explained with reference to FIGS. 8A and 8B. In this embodiment, instead of employing the collector 10 provided with the connecting strips 25, a plurality of connecting rods 28 are provided being appropriately spaced from each other so as to penetrate lead portions 9 on both sides of an electrode plate group 8 and at least one of both ends of the connecting rods 28 is connected to an electroconductive plate 23.

Also in this embodiment, the effects and advantages similar to those of the third embodiment result.

[Fifth Embodiment]

Figure 9:
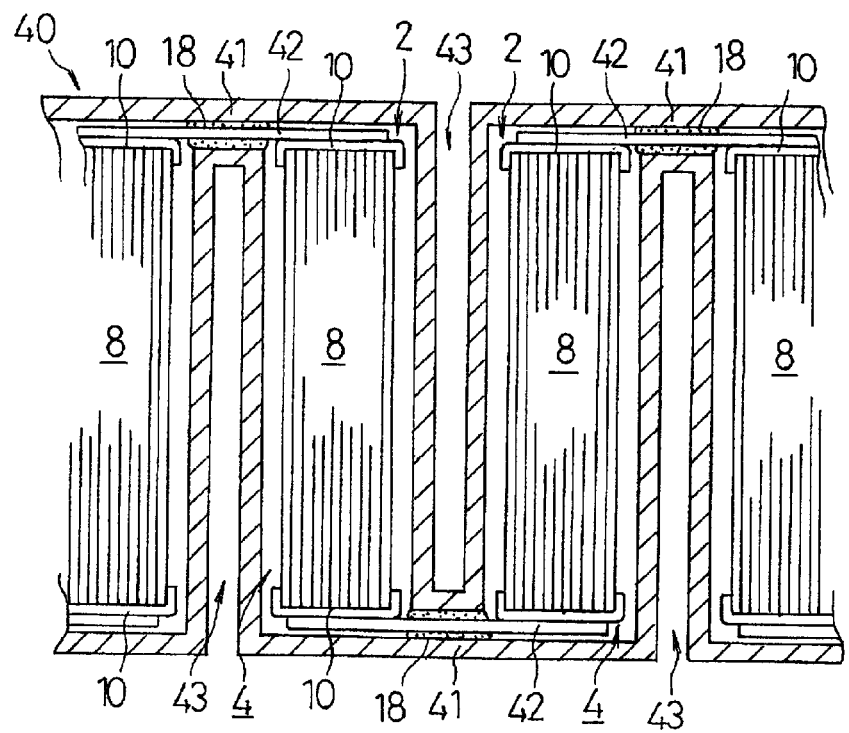
FIG. 9 illustrates a fifth embodiment of the prismatic battery module of the invention showing a primary horizontal sectional/plan view of the battery module.

A fifth embodiment of the prismatic battery module according to the invention will be explained with reference to FIG. 9.

In this embodiment, a prismatic battery case 40 is constructed such that a plurality of prismatic cell cases 4 are arranged alongside one by one being spaced apart from each other and further arranged in such a manner that one of both ends of a cell case 4 and one of both ends of another cell case adjacent to the cell case 4 are spatially connected to each other at a connection portion 41 having a communicating space to thereby form a zigzag chain of cell cases. Furthermore, a plurality of electrode plate groups 8 are arranged alongside one by one having the same pitch as that of the arrangement of the plurality of cell cases 4, each of the plurality of electrode plate groups 8 having lead portions, to which collectors 10 are connected, on both sides thereof, and further arranged in such a manner that one of the collectors 10 of one electrode plate group 8 and one of the collectors 10 of another electrode plate group 8 adjacent to the electrode plate group 8 are connected to each other via an electroconductive plate 42 to thereby form a zigzag chain of electrode plate groups. After the above-described arrangement of the cell cases and the electrode plate groups, a plurality of electrode plate groups 8 connected together in series via the associated electroconductive plates 42 are disposed in the prismatic battery case 40 and a plurality of cell cases 4 are partitioned from one another at the respective connection portions 41 between the cell cases 4 of the prismatic battery case 40 by sealing materials 18 such as a pitch provided between the electroconductive plates 42 and the prismatic battery case 40.

According to this embodiment, as the adjacent collectors 10 of the associated electrode plate groups 8 are connected to each other via the electroconductive plate 42 over the whole surface area of the adjacent collectors, the communication path between the adjacent electrode plate groups 8 becomes shorter realizing the reduction of the internal resistance. Furthermore, sealing each space formed between each of the electroconductive plates 42 and the prismatic battery case 40 by the sealing materials 18 such as a pitch allows the plurality of cell cases 4 to be partitioned from one another at the respective connection portions 41 of the prismatic battery case 40. In addition to it, each space between the cell cases 4 can be utilized as a coolant passage 43, resulting in the achievement of high cooling performance of prismatic battery module.

In this embodiment, although the case where the electroconductive plates 42 are connected to the collectors 10 that are connected to both sides of the electrode plate group 8 and a plurality of electrode plate groups 8 are connected together in series in a form of zigzag chain is explained, instead of it, the case where the collectors 10 are omitted and the lead portions on both sides of the electrode plate group 8 are directly connected to the electroconductive plates 42 to form the arrangement of a plurality of electrode plate groups 8 connected together in series in a form of zigzag chain may be employed.

[Sixth Embodiment]

Figure 10:
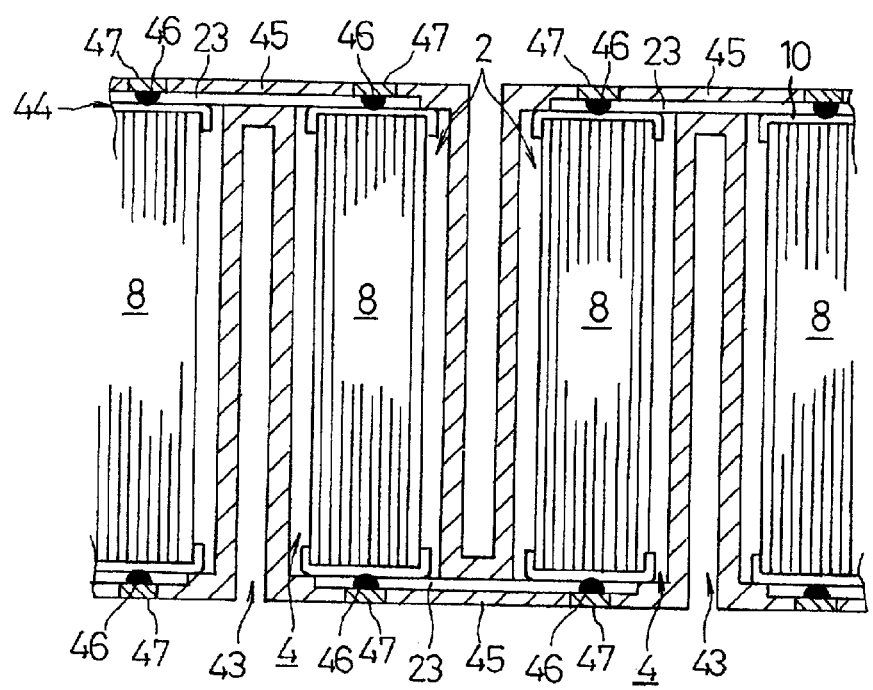
FIG. 10 illustrates a sixth embodiment of the prismatic battery module of the invention showing a primary horizontal sectional/plan view of the battery module.

A sixth embodiment of the prismatic battery module according to the invention will be explained with reference to FIG. 10.

In this embodiment, a prismatic battery case 44 is constructed such that a plurality of prismatic cell cases 4 are arranged alongside one by one being spaced apart from each other and further arranged in such a manner that one of both ends of a cell case 4 and one of both ends of another cell case 4 adjacent to the cell case 4 are connected to each other at a connection portion 45 to thereby form a zigzag chain of cell cases 4, and at the same time, an electroconductive plate 23 is provided in the connection portion 45 so as to face adjacent cell cases 4. Furthermore, a plurality of electrode plate groups 8, each having lead portions, to which collectors 10 are connected, on both sides thereof, are disposed in the associated cell cases 4, and each of the collectors 10 and the associated electroconductive plate 23 are connected via a plurality of welding portions 46 provided being appropriately spaced apart from each other. In order to bond the electroconductive plate 23 and the collector 10 together, laser beam is irradiated through a window formed in the prismatic battery case 44 at the welding portion 46 thereof and then, a solder adhering to either the electroconductive plate 23 or one of the electroconductive plate 23 and the collector 10 is welded. Thereafter, the window is sealed with a sealing material 47.

According to this embodiment, as the adjacent collectors 10 of the associated electrode plate groups 8 are connected to each other via the electroconductive plate 23 over the whole surface area of the collectors, the electrical communication path between the adjacent electrode plate groups 8 becomes shorter allowing the reduction of the internal resistance and in addition to it, each space between the cell cases 4 can be utilized as a coolant passage 43, resulting in the achievement of high cooling performance of prismatic battery module.

[Seventh Embodiment]

Figure 11:
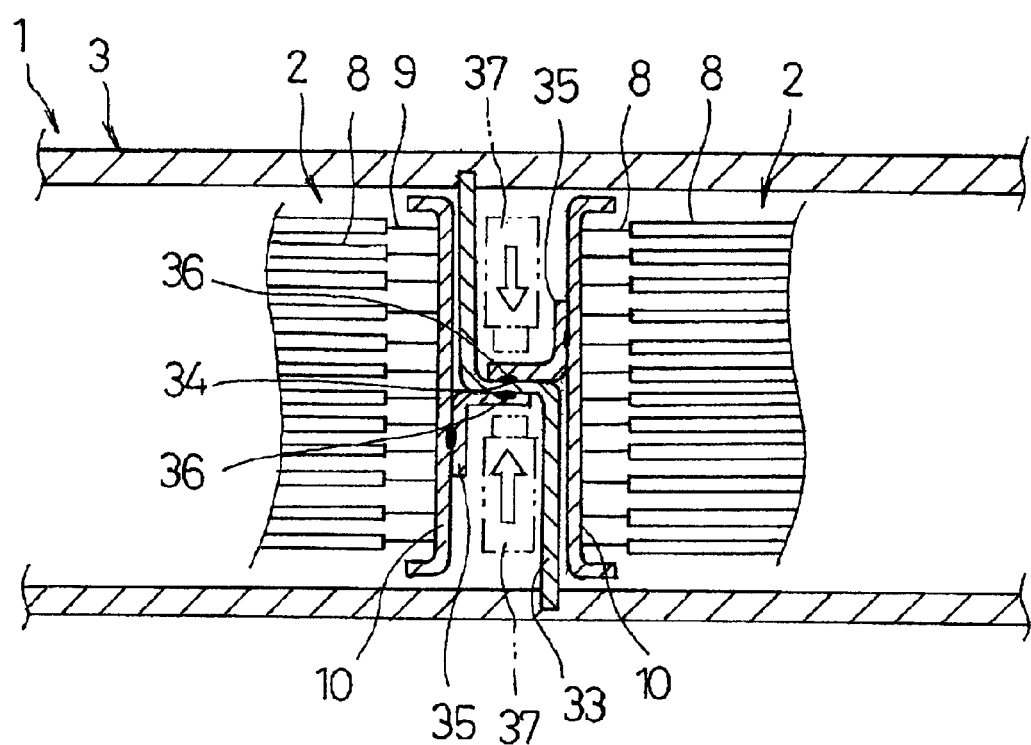
FIG. 11 illustrates a seventh embodiment of the prismatic battery module of the invention showing a primary horizontal sectional/plan view of the battery module.

A seventh embodiment of the prismatic battery module according to the invention will be explained with reference to FIG. 11.

In this embodiment, instead of the construction of a prismatic battery case 3 that includes a separation wall 5 therein, the following construction is employed. That is, a prismatic battery case 3 is constructed such that a plurality of cell cases 4 are partitioned from one another by associated crank-shaped electroconductive plates 33, each having connection surfaces 34 formed along an arrangement direction of the cell cases 4. Furthermore, to collectors 10, which are connected to lead portions 9 on both sides of an electrode plate group 8, are connected connecting strips 35, each having a surface contacting the associated connection surface 34 flatly, and the opposing connecting strips 35 of the adjacent collectors 10 of the associated electrode plate groups 8 accommodated in the respective adjacent cell cases 4 are disposed so as to face each other interposing the connection surfaces 34 therebetween and be in electrical communication with each other at the respective welding portions 36. At the time of the welding performed at the welding portions 36, welding electrodes 37 are disposed in the spaces on both sides of the respective connection surfaces 34 of the crank-shaped electroconductive plate 33, and therefore, the opposing connecting strips 35 of the adjacent collectors 10 and the electroconductive plate 33 are welded together with high reliability by resistance welding or the like.

According to this embodiment, as the adjacent collectors 10 of the associated electrode plate groups 8 are connected to each other via the crank-shaped electroconductive plate 33 constituting a separation wall between adjacent cell cases 4, the electrical communication path between the adjacent electrode plate groups 8 becomes shorter allowing the reduction of the internal resistance and in addition to it, the upper portion of the collector 10 is not required to project upwardly from the electrode plate group, resulting in the volume reduction of prismatic battery case.

According to the prismatic battery module of the present invention and the method for manufacturing the same, the electrical communication path between the adjacent electrode plate groups becomes shorter allowing the reduction of the internal resistance leading to the maintenance of low internal resistance per cell, and the reduction of heat generation of the cell and further the elongation of service run time of battery together with the realization of high output performance of battery.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A prismatic battery module comprising:
    a prismatic battery case constructed by connecting a plurality of prismatic cell cases together in series, each said prismatic cell case having short lateral walls and long lateral walls, said plurality of cell cases being separated from one another by separation walls comprising said short lateral walls respectively;
    an electrode plate group formed by alternately stacking positive and negative electrode plates interposing a separator therebetween and further forming lead portions by projecting one side portion of said positive electrode plates and one side portion of said negative electrode plates in opposite directions, respectively; and collectors connected to said lead portions on both sides of said electrode plate group, said prismatic battery module being further constructed such that adjacent electrode plate groups consisting of said electrode plate group are connected to each other by connecting adjacent collectors of the respective electrode plate groups to each other through a connection aperture formed in a central portion of said separation wall and disposing said adjacent electrode plate groups in respective cell cases alongside in series, and a sealing material is applied to each space between each of said separation walls around said connection aperture and each of said collectors.

2. The prismatic battery module according to claim 1, wherein the adjacent collectors are connected to each other by using an electroconductive adhesive coated on opposing portions of said adjacent collectors, said opposing portions facing each other.

3. A prismatic battery module comprising:

a prismatic battery case having a single internal space therein, said single internal space formed by a plurality of cell cases connected together in series;

an electrode plate group formed by alternately stacking positive and negative electrode plates interposing a separator therebetween and further forming lead portions by projecting one side portion of said positive electrode plates and one side portion of said negative electrode plates in opposite directions, respectively; and collectors connected to said lead portions on both sides of said electrode plate group, said prismatic battery module being further constructed such that a plurality of electrode plate groups consisting of said electrode plate group are connected together by connecting adjacent collectors of the adjacent electrode plate groups to each other and arranging said plurality of electrode plate groups alongside in series in said prismatic battery case, and said single internal space is partitioned into a plurality cell cases by applying a sealing material to each space between outer periphery of said adjacent collectors and a wall surface of said prismatic battery case.

4. The prismatic battery module according to claim 3, wherein said adjacent collectors, each having L-flanges formed on both sides thereof, are connected together to form T-shaped portions in both side portions of said adjacent collectors, and T-slots are formed in respective portions of sidewalls of said prismatic battery case, each of said respective portions of sidewalls corresponding to a position of a separation wall located between said plurality of cell cases, for said T-shaped portions to engage said T-slots respectively.

5. The prismatic battery module according to claim 3, wherein a seal rubber used as said sealing material is fixedly bonded to entire outer periphery of said adjacent collectors and an outer periphery of said seal rubber is pressed against wall surfaces of said prismatic battery case for sealing spaces formed between said adjacent collectors and said wall surfaces of said prismatic battery case.

6. The prismatic battery module according to claim 3, wherein said adjacent collectors are connected to each other by welding said adjacent collectors to an electroconductive plate disposed therebetween and spaces between outer peripheries of said electroconductive plate and wall surfaces of said prismatic battery case are sealed with a sealing material.

7. The prismatic battery module according to claim 3, wherein said adjacent collectors are connected to each other by welding connection projections provided on said adjacent collectors together and spaces between outer peripheries of said collectors and wall surfaces of said prismatic battery case are sealed with a sealing material.

8. The prismatic battery module according to claim 3, wherein said lead portions of adjacent electrode plate groups are connected to a U-shaped collector and spaces between outer peripheries of said U-shaped collector and wall surfaces of said prismatic battery case are sealed with a sealing material.

9. The prismatic battery module according to claim 3, wherein the adjacent collectors are connected to each other by using an electroconductive adhesive coated on opposing portions of said adjacent collectors, said opposing portions facing each other.

10. A prismatic battery module comprising:

a prismatic battery case constructed by connecting a plurality of prismatic cell cases together in series, each said prismatic cell case having short lateral walls and long lateral walls, said plurality of cell cases being separated from one another by separation walls comprising said short lateral walls respectively;

an electrode plate group formed by alternately stacking positive and negative electrode plates interposing a separator therebetween and further forming lead portions by projecting one side portion of said positive electrode plates and one side portion of said negative electrode plates in opposite directions, respectively;

collectors connected to said lead portions on both sides of said electrode plate group; and an electroconductive plate provided in at least one sidewall of said prismatic battery case and facing adjacent cell cases, said electroconductive plate being connected to adjacent collectors of adjacent electrode plate groups.

11. The prismatic battery module according to claim 10 wherein electroconductive plates are provided in both sidewalls of said prismatic battery case, and working openings are formed in said both sidewalls of said prismatic battery case so as to expose said electroconductive plates, and said electroconductive plates and selected one from said collectors and a plurality of connecting rods are bonded together by using one bonding method selected from resistance welding and soldering, said one bonding method being performed by supplying welding current between both of said electroconductive plates in a state of said electroconductive plates and said selected one from said collectors and said plurality of connecting rods being in contact with each other.

12. A prismatic battery module comprising:

a prismatic battery case constructed by connecting a plurality of prismatic cell cases together in series, said plurality of cell cases being separated from one another by separation walls respectively;

an electrode plate group formed by alternately stacking positive and negative electrode plates interposing a separator therebetween and further forming lead portions by projecting one side portion of said positive electrode plates and one side portion of said negative electrode plates in opposite directions, respectively;

a plurality of connecting rods formed so as to penetrate said lead portions on both sides of said electrode plate group, respectively; and an electroconductive plate provided in at least one sidewall of said prismatic battery case and facing adjacent cell cases, each of said plurality of connecting rods and said electroconductive plate being connected to each other.

13. The prismatic battery module according to claim 12, wherein electroconductive plates are provided in both sidewalls of said prismatic battery case, and working openings are formed in said both sidewalls of said prismatic battery case so as to expose said electroconductive plates, and said electroconductive plates and selected one from said collectors and said plurality of connecting rods are bonded together by using one bonding method selected from resistance welding and soldering, said one bonding method being performed by supplying welding current between both of said electroconductive plates in a state of said electroconductive plates and said selected one from said collectors and said plurality of connecting rods being in contact with each other.

14. A prismatic battery module comprising:

a prismatic battery case constructed by connecting a plurality of prismatic cell cases together, said plurality of cell cases being arranged alongside one by one in addition to being spaced apart from each other and being constructed in such a manner that one of both ends of one of said cell cases and one of both ends of another one of said cell cases adjacent to said one of cell cases are spatially connected to each other through a communicating space at a position of a connection portion to thereby form a zigzag chain of said plurality of cell cases;

an electrode plate group formed by alternately stacking positive and negative electrode plates interposing a separator therebetween and further forming lead portions by projecting one side portion of said positive electrode plates and one side portion of said negative electrode plates in opposite directions, respectively; and an electroconductive plate for providing electrical communication between a plurality of electrode plate groups by connecting said plurality of electrode plate groups together in such a manner that one of both lead portions of one of adjacent electrode plate groups and one of both lead portions of the other of said electrode plate groups are connected via said electroconductive plate to thereby form a zigzag chain of said plurality of electrode plate groups, said zigzag chain of said electrode plate groups being arranged alongside so as to have the same pitch as that of an arrangement of said plurality of cell cases, said plurality of electrode plate groups connected together via associated electroconductive plates being disposed in said prismatic battery case and each space between said electroconductive plate and said prismatic battery case at said connection portion between said cell cases of said prismatic battery case being sealed with a sealing material.

15. A prismatic battery module comprising:

a prismatic battery case constructed by connecting a plurality of prismatic cell cases together, said plurality of cell cases being arranged alongside one by one in addition to being spaced apart from each other and being constructed in such a manner that one of both ends of one of said cell cases and one of both ends of another one of said cell cases adjacent to said one of cell cases are connected to each other to thereby form a zigzag chain of said plurality of cell cases;

an electrode plate group formed by alternately stacking positive and negative electrode plates interposing a separator therebetween and further forming lead portions by projecting one side portion of said positive electrode plates and one side portion of said negative electrode plates in opposite directions, respectively;

collectors connected to said lead portions on both sides of said electrode plate group; and an electroconductive plate provided in a cell case connection portion of said prismatic battery case and facing adjacent cell cases, said electroconductive plate providing electrical connection between adjacent collectors of associated electrode plate groups.

16. A prismatic battery module comprising:

a prismatic battery case constructed by connecting a plurality of prismatic cell cases together in series, via associated separation walls made of a crank-shaped electroconductive plate, each of said separation walls having connection surfaces being arranged along a direction of an arrangement of said plurality of cell cases in addition to being formed in a central portion in a width direction of said cell case;

an electrode plate group formed by alternately stacking positive and negative electrode plates interposing a separator therebetween and further forming lead portions by projecting one side portion of said positive electrode plates and one side portion of said negative electrode plates in opposite directions, respectively; and collectors connected to said lead portions on both sides of said electrode plate group;

said prismatic battery case accommodating said plurality of cell cases such that associated parts of adjacent collectors of adjacent electrode plate groups, said adjacent electrode plate groups being disposed in adjacent cell cases, faces each other interposing said connection surfaces therebetween and said adjacent collectors are connected to each other by welding said adjacent collectors to associated connection surfaces interposing said associated connection surfaces therebetween.

17. A method for manufacturing a prismatic battery module, comprising the steps of:

forming a prismatic battery case having a plurality of cell cases therein, each said prismatic cell case having short lateral walls and long lateral walls, said plurality of cell cases being connected together in series via associated separation walls comprising said short lateral walls and connection apertures, each connection aperture being located in a central portion of each of said separation walls;

forming an electrode plate group having positive and negative electrode plates therein so as to project lead portions of said positive and negative electrode plates therefrom on both sides thereof;

connecting collectors to said lead portions of said electrode plate group; and inserting said electrode plate group in said cell case in such a manner that adjacent collectors of associated electrode plate groups are connected to each other via each of said connection apertures and at the same time, each space formed around said adjacent collectors is sealed.

18. A method for manufacturing a prismatic battery module, comprising the steps of:
forming a prismatic battery case having a single internal space formed by a plurality of prismatic cell cases connected together in series therein;
forming an electrode plate group having positive and negative electrode plates therein so as to project lead portions of said positive and negative electrode plates therefrom on both sides thereof;
connecting collectors to said lead portions of said electrode plate group;
integrally connecting a plurality of electrode plate groups together in series, each of said electrode plate groups having said collectors connected thereto, in such a manner that adjacent collectors of associated electrode plate groups are connected to each other; and
inserting said plurality of electrode plate groups in said prismatic battery case in a state of individual opposing portions consisting of said adjacent collectors and an inner wall of said prismatic battery case interposing a sealing material therebetween.

19. A method for manufacturing a prismatic battery module, comprising the steps of:
forming a prismatic battery case having a plurality of cell cases integrally therein and an electroconductive plate facing adjacent cell cases in addition to being located between adjacent end portions of said adjacent cell cases;
forming an electrode plate group having positive and negative electrode plates therein so as to project lead portions of said positive and negative electrode plates therefrom on both sides thereof;
connecting one of collectors and connecting rods to said lead portions of said electrode plate group; and
inserting said electrode plate group in said cell case and connecting one of said collectors and said connecting rods to said electroconductive plate.

20. A method for manufacturing a prismatic battery module, comprising the steps of:
forming a prismatic battery case having a single internal space formed by a plurality of prismatic cell cases connected together in series therein;
forming an electrode plate group having positive and negative electrode plates therein so as to project lead portions of said positive and negative electrode plates therefrom on both sides thereof;
connecting electroconductive plates to said lead portions of said electrode plate group and integrally connecting a plurality of electrode plate groups together in series via said electroconductive plates; and
disposing said plurality of electrode plate groups in said prismatic battery case in a state of individual opposing portions consisting of each of said electroconductive plates and an inner wall of said prismatic battery case interposing a sealing material therebetween, thereby partitioning said internal space into a plurality of cell cases.

21. A prismatic battery module comprising:
a prismatic battery case having a single internal space therein;
an electrode plate group formed by alternately stacking positive and negative electrode plates interposing a separator therebetween and further forming lead portions by projecting one side portion of said positive electrode plates and one side portion of said negative electrode plates in opposite directions, respectively; and
collectors connected to said lead portions on both sides of said electrode plate group,
said prismatic battery module being further constructed such that a plurality of electrode plate groups consisting of said electrode plate group are connected together by connecting adjacent collectors of the adjacent electrode plate groups to each other and arranging said plurality of electrode plate groups alongside in series in said prismatic battery case, and said single internal space is partitioned into a plurality cell cases by applying a sealing material to each space between outer periphery of said adjacent collectors and a wall surface of said prismatic battery case;
wherein said adjacent collectors, each having L-flanges formed on both sides thereof, are connected together to form T-shaped portions in both side portions of said adjacent collectors, and T-slots are formed in respective portions of sidewalls of said prismatic battery case, each of said respective portions of sidewalls corresponding to a position of a separation wall located between said plurality of cell cases, for said T-shaped portions to engage said T-slots respectively.

22. A prismatic battery module comprising:
a prismatic battery case constructed by connecting a plurality of prismatic cell cases together in series, said plurality of cell cases being separated from one another by separation walls respectively;
an electrode plate group formed by alternately stacking positive and negative electrode plates interposing a separator therebetween and further forming lead portions by projecting one side portion of said positive electrode plates and one side portion of said negative electrode plates in opposite directions, respectively; and
collectors connected to said lead portions on both sides of said electrode plate group,
said prismatic battery module being further constructed such that adjacent electrode plate groups consisting of said electrode plate group are connected to each other by connecting adjacent collectors of the respective electrode plate groups to each other through a connection aperture formed in a central portion of said separation wall and disposing said adjacent electrode plate groups in respective cell cases alongside in series, and a sealing material is applied to each space between each of said separation walls around said connection aperture and each of said collectors;
wherein the adjacent collectors are connected to each other by using an electroconductive adhesive coated on opposing portions of said adjacent collectors, said opposing portions facing each other.

23. A prismatic battery module comprising:
a prismatic battery case having a single internal space therein;
an electrode plate group formed by alternately stacking positive and negative electrode plates interposing a separator therebetween and further forming lead portions by projecting one side portion of said positive electrode plates and one side portion of said negative electrode plates in opposite directions, respectively; and
collectors connected to said lead portions on both sides of said electrode plate group, said prismatic battery module being further constructed such that a plurality of electrode plate groups consisting of said electrode plate group are connected together by connecting adjacent collectors of the adjacent electrode plate groups to each other and arranging said plurality of electrode plate groups alongside in series in said prismatic battery case, and said single internal space is partitioned into a plurality cell cases by applying a sealing material to each space between outer periphery of said adjacent collectors and a wall surface of said prismatic battery case;

wherein said adjacent collectors are connected to each other by welding connection projections provided on said adjacent collectors together and spaces between outer peripheries of said collectors and wall surfaces of said prismatic battery case are sealed with a sealing material.

24. A prismatic battery module comprising:

a prismatic battery case having a single internal space therein;

an electrode plate group formed by alternately stacking positive and negative electrode plates interposing a separator therebetween and further forming lead portions by projecting one side portion of said positive electrode plates and one side portion of said negative electrode plates in opposite directions, respectively; and collectors connected to said lead portions on both sides of said electrode plate group, said prismatic battery module being further constructed such that a plurality of electrode plate groups consisting of said electrode plate group are connected together by connecting adjacent collectors of the adjacent electrode plate groups to each other and arranging said plurality of electrode plate groups alongside in series in said prismatic battery case, and said single internal space is partitioned into a plurality cell cases by applying a sealing material to each space between outer periphery of said adjacent collectors and a wall surface of said prismatic battery case;

wherein said lead portions of adjacent electrode plate groups are connected to a U-shaped collector and spaces between outer peripheries of said U-shaped collector and wall surfaces of said prismatic battery case are sealed with a sealing material.

25. A prismatic battery module comprising:

a prismatic battery case constructed by connecting a plurality of prismatic cell cases together in series, said plurality of cell cases being separated from one another by separation walls respectively;

an electrode plate group formed by alternately stacking positive and negative electrode plates interposing a separator therebetween and further forming lead portions by projecting one side portion of said positive electrode plates and one side portion of said negative electrode plates in opposite directions, respectively;

collectors connected to said lead portions on both sides of said electrode plate group; and an electroconductive plate provided in at least one sidewall of said prismatic battery case and facing adjacent cell cases, said electroconductive plate being connected to adjacent collectors of adjacent electrode plate groups;

wherein electroconductive plates are provided in both sidewalls of said prismatic battery case, and working openings are formed in said both sidewalls of said prismatic battery case so as to expose said electroconductive plates, and said electroconductive plates and selected one from said collectors and a plurality of connecting rods are bonded together by using one bonding method selected from resistance welding and soldering, said one bonding method being performed by supplying welding current between both of said electroconductive plates in a state of said electroconductive plates and said selected one from said collectors and said plurality of connecting rods being in contact with each other.

26. A prismatic battery module comprising:

a prismatic battery case having a single internal space therein;

an electrode plate group formed by alternately stacking positive and negative electrode plates interposing a separator therebetween and further forming lead portions by projecting one side portion of said positive electrode plates and one side portion of said negative electrode plates in opposite directions, respectively; and collectors connected to said lead portions on both sides of said electrode plate group, said prismatic battery module being further constructed such that a plurality of electrode plate groups consisting of said electrode plate group are connected together by connecting adjacent collectors of the adjacent electrode plate groups to each other and arranging said plurality of electrode plate groups alongside in series in said prismatic battery case, and said single internal space is partitioned into a plurality cell cases by applying a sealing material to each space between outer periphery of said adjacent collectors and a wall surface of said prismatic battery case;

wherein the adjacent collectors are connected to each other by using an electroconductive adhesive coated on opposing portions of said adjacent collectors, said opposing portions facing each other.

* * * * *